US011248110B2

(12) United States Patent
Agoretti et al.

(10) Patent No.: US 11,248,110 B2
(45) Date of Patent: Feb. 15, 2022

(54) RUBBER COMPOUND FOR TREAD PORTIONS

(71) Applicant: BRIDGESTONE CORPORATION, Tokyo (JP)

(72) Inventors: Pasquale Agoretti, Rome (IT); Claudio D'Alfonso, Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 269 days.

(21) Appl. No.: 16/608,446

(22) PCT Filed: Apr. 24, 2018

(86) PCT No.: PCT/EP2018/060430
§ 371 (c)(1),
(2) Date: Oct. 25, 2019

(87) PCT Pub. No.: WO2018/202474
PCT Pub. Date: Nov. 8, 2018

(65) Prior Publication Data
US 2020/0190294 A1   Jun. 18, 2020

(30) Foreign Application Priority Data
May 3, 2017   (IT) .................. 102017000047751

(51) Int. Cl.
*C08L 9/06*   (2006.01)
*B60C 1/00*   (2006.01)
*B60C 11/00*   (2006.01)

(52) U.S. Cl.
CPC .............. *C08L 9/06* (2013.01); *B60C 1/0016* (2013.01); *B60C 11/0008* (2013.01); *B60C 2011/0025* (2013.01); *C08L 2205/025* (2013.01); *C08L 2205/03* (2013.01); *C08L 2312/02* (2013.01)

(58) Field of Classification Search
CPC .......... C08L 9/06; C08L 21/00; B60C 1/0016; B60C 11/0008; C10N 2040/36
USPC ......................................................... 524/388
See application file for complete search history.

(56) References Cited

U.S. PATENT DOCUMENTS

| 2003/0161798 | A1  | 8/2003 | Kellner et al. |
| 2005/0136217 | A1* | 6/2005 | Barthlott ................. B08B 17/06 428/141 |
| 2013/0158190 | A1* | 6/2013 | Fujikura ................... C08L 7/00 524/571 |
| 2014/0100310 | A1  | 4/2014 | Cai et al. |

FOREIGN PATENT DOCUMENTS

| EP | 3 012 291 A1 | 4/2016 |
| JP | 59-217782 A  | 12/1984 |

OTHER PUBLICATIONS

Natural Sourcing, Pink Lotus Floral Wax (2016) (Year: 2016).*
Hans J. Ensikat, et al., "Superhydrophobicity in perfection: the outstanding properties of the lotus leaf", Beilstein Journal of Nanotechnology, Mar. 2011, pp. 152-161, vol. 2011, No. 2.
International Search Report for PCT/EP2018/060430 dated Jul. 12, 2018 (PCT/ISA/210).
Written Opinion for PCT/EP2018/060430 dated Jul. 12, 2018 (PCT/ISA/237).

* cited by examiner

*Primary Examiner* — Doris L Lee
(74) *Attorney, Agent, or Firm* — Sughrue Mion, PLLC

(57) ABSTRACT

Rubber compound for the preparation of a tread portion of a pneumatic tyre comprising at least a cross-linkable unsaturated chain polymer base, a filler and a vulcanization system and a wax composed of at least 50% by weight of nonacosanediols.

12 Claims, No Drawings

RUBBER COMPOUND FOR TREAD PORTIONS

CROSS REFERENCE TO RELATED APPLICATIONS

This application is a National Stage of International Application No. PCT/EP2018/060430 filed Apr. 24, 2018, claiming priority based on Italian Patent Application No. 102017000047751 filed May 3, 2017.

The present invention relates to a rubber compound for a tread portion comprising a wax, wherein the composition thereof is such as to confer an improvement in terms of wet grip without, for this reason, leading to the worsening of other features.

Part of the research in the field of pneumatic tyres is concentrated on obtaining tread that has improved performance in terms of wet grip.

Research in the sector has produced various solutions, many of which, however, are not very convenient insofar as—notwithstanding the fact that they favor an improvement in terms of wet grip—they nonetheless lead to the worsening of other characteristics.

For example, it is now known that an increase within the compound of the quantity of silica or the use of low molecular weight resin, even though they give an improvement in wet grip, lead to worsening respectively in rolling resistance and abrasion resistance.

The need was therefore felt to have a solution that was able to guarantee improvements in wet grip without these improvements simultaneously leading to the worsening of other characteristics.

The inventors of the present invention have surprisingly found that the use within a compound of a particular wax makes it possible to satisfy the aforementioned need.

The object of the present invention is a rubber compound for the preparation of a tread portion for a pneumatic tyre; said rubber compound comprising at least a cross-linkable unsaturated chain polymer base, a filler and a vulcanization system; said rubber compound being characterized in that it comprises a wax composed of at least 50% by weight of nonacosanediols.

Here and hereinafter by wax is meant a substance that is malleable at ambient temperature, with a viscosity that is relatively low when melted, insoluble in water and hydrophobic.

Here and hereinafter, by the term "cross-linkable unsaturated-chain polymer base" is meant any natural or synthetic non-cross-linked polymer capable of assuming all of the chemical-physical and mechanical characteristics typically assumed by elastomers after cross-linking (vulcanization) with sulfur- or peroxides-based systems.

Here and hereinafter, by vulcanization system is meant a complex of ingredients comprising at least sulfur and accelerating compounds that in the preparation of the compound are added during a final blending stage and have the purpose of promoting the vulcanization of the polymer base once the compound is subjected to a vulcanization temperature.

Preferably, said nonacosanediols comprise a C2-C6 chain arranged between the two hydroxyl groups.

Preferably, said nonacosanediols are included in the group comprising nonacosane-4,10-diol, nonacosane-5,10-diol, nonacosane-10,13-diol, nonacosane-12,15-diol.

Preferably, said wax is derived from Lotus leaves. Preferably, said wax is present within the compound in a quantity of between 0.3 and 30 phr, more preferably between 1 and 5 phr.

Another object of the present invention is a tread portion made with a compound according to the present invention and a pneumatic tyre comprising such a tread portion.

Still another object of the present invention is the use of a wax composed of at least 50% by weight of nonacosanediols within a rubber compound for the preparation of a portion of pneumatic tyre tread.

The following are examples of non-limiting embodiments given purely by way of illustration.

Four rubber compounds were made, of which the first three (Compounds A-C) constitute comparison examples, whilst the last one (Compound D) was made according to the present invention.

In particular, the first comparison compound (Compound A) is a standard tread compound both of a wax and a low molecular weight resin; the second comparison compound (Compound B) differs from Compound A in the use of a low molecular weight resin; the third comparison compound (Compound C) differs from Compound A in the use of a wax, nonetheless with hydrophobic characteristics but with a composition that differs from that used according to the present invention.

The compound according to the present invention (Compound D) differs from Compound A in the use of a wax according to the present invention.

The example compounds were prepared according to the procedure below.

PREPARATION OF THE COMPOUNDS ($1^{st}$ Productive Blending Step—MASTERBATCH)

Before the start of the blending, a mixer with tangential rotors and an internal volume of between 230 and 270 liters was loaded with the cross-linkable unsaturated chain polymer base, the silica, the silane bonding agent and the carbon black reaching a fill factor of 66-72%.

The mixer was operated at a speed of 40-60 rpm, and the mixture thus formed was discharged once a temperature of 145-165° C. had been reached.

($2^{nd}$ Non-Productive Blending Step)

The mixture from the previous step was reworked in the mixer operating at a speed of 40-60 rpm and subsequently removed once a temperature of 130-150° C. had been reached.

(Productive Blending Step)

The vulcanization system, zinc oxide, stearic acid and, when required, the low molecular weight resin or wax was added to the mixture obtained from the previous step, reaching a fill factor of 63-67%.

The mixer was operated at a speed of 20-40 rpm, and the mixture thus formed was discharged once a temperature of 100-110° C. had been reached.

Here and hereinafter by "non-productive blending step" is meant a blending step wherein, to the cross-linkable unsaturated chain polymer base are added and mixed the ingredients of the compound with the exception of the vulcanization system; while by "productive blending step" is meant a blending step wherein to the compound under preparation the vulcanization system is added and blended.

Table I shows the compositions in phr of the Compounds A-D.

TABLE I

|  | A | B | C | D |
|---|---|---|---|---|
| First non-productive blending step | | | | |
| S-SBR | | | 80.0 | |
| BR | | | 20.0 | |
| Silica | | | 80.0 | |
| Carbon black | | | 8.0 | |
| Silane bonding agent | | | 8.0 | |
| Productive blending step | | | | |
| Sulfur | | | 1.5 | |
| ZnO | | | 1.5 | |
| Stearic acid | | | 1.5 | |
| TBBS | | | 1.5 | |
| DPG | | | 1.0 | |
| Low molecular weight resin | — | 2.0 | — | — |
| Wax* | — | — | 2.0 | — |
| Wax** | — | — | — | 2.0 |

S-SBR is a polymer base obtained by means of a polymerization process in a solution with an average molecular weight, respectively, of between $800\text{-}1500\times10_3$ and of between $500\text{-}900\times10_3$, with a styrene content of between 10 and 45% and a vinyl content of between 20 and 70%.

BR is a polymer base constituted from polybutadiene

The silica is a silica with a surface area of about 170 m²/g and marketed under the name Ultrasil VN3 by the EVONIK company.

The carbon black is N134

The silane bonding agent is marketed under the name SI75 by the EVONIK company.

TBBS is the acronym for the compound N-tert-butyl-2-benzothiazole sulfenamide, which is used as a vulcanization accelerant.

DPG is the acronym for the compound Diphenyl-guanidine used as a vulcanization accelerant.

The low molecular weight resin is of the type Petroleum Hydrocarbon Resin (CAS 64742-16-1)

The wax* is a paraffin wax that does not satisfy the requirements called for by the present invention. In particular, the paraffin wax used in Compound C is Paraffin wax Sigma Aldrich (mp 58-62° C.)

The wax** is a wax according to the present invention. In particular, the wax used in Compound D is derived from Lotus leaves and is marketed under the name Lotus Floral Wax (INCI: *Nelumbo nucifera* Floral Wax) by the company Natural Sourcing, LLC.

The compounds listed in Table I, once vulcanized, were subjected to a wet grip measurement, a rolling resistance measurement, and an abrasion resistance measurement.

The wet grip was measured by comparing the friction coefficient of the compounds by means of a linear friction meter, under wet conditions, at a velocity of 500 mm/s and at a temperature of 5° C. The results were obtained by comparing the respective frictions coefficients: the larger the index, the higher the friction coefficient and, therefore, the greater the wet grip.

The rolling resistance derives from the dynamic properties of the compounds. The rolling resistance parameter is correlated to the tan δ values at 60° C.: the lower the tan δ value at 60° C., the better the resulting rolling resistance. The dynamic properties were measured according to the ASTM D5992 standard.

The abrasion resistance was measured according to the DIN 53516 standard.

For a more immediate understanding of the advantages of the present invention, Table II reports the values of the measurements above indexed to the values of the comparison compound A.

TABLE II

|  | A | B | C | D |
|---|---|---|---|---|
| Wet grip | 100 | 105 | 100 | 110 |
| Rolling resistance | 100 | 95 | 100 | 100 |
| Abrasion resistance | 100 | 90 | 100 | 100 |

The higher the values reported in Table II, the better the relative characteristics are to be considered.

From the values reported in Table II it is evident that the use of the wax according to the present invention makes it possible to impart an improvement to the tread portion in terms of wet grip without, for this reason, leading to the worsening of the other characteristics, such as the resistance rolling or the abrasion resistance.

In fact, the values in relation to Compound B demonstrate how the use of a low molecular weight resin, even though it guarantees an improvement in wet grip, nonetheless leads to worsening of both the rolling resistance and abrasion resistance.

Furthermore, from a comparison of Compounds C and D it is evident that a hydrocarbon wax that does not satisfy the requirements called for by the present invention, even though it is hydrophobic, is not capable of conferring those advantages in terms of wet grip that instead, as the values in relation to Compound D demonstrate, the wax according to the present invention confers. This comparison serves to demonstrate that it is not the generic characteristics of the wax, but the presence of at least 50% by weight of nonacosanediols that confers the aforementioned advantages in terms of wet grip.

The invention claimed is:

1. Rubber compound for the preparation of a tread portion of a pneumatic tyre; said rubber compound comprising at least a cross-linkable unsaturated chain polymer base, a filler and a vulcanization system; said rubber compound being characterized in that it comprises a wax composed of at least 50% by weight of nonacosanediols.

2. Rubber compound according to claim 1, characterized in that said nonacosanediols comprise a C2-C6 chain arranged between the two hydroxyl groups.

3. Rubber compound according to claim 2, characterized in that said nonacosanediols are comprised in the group comprising nonacosane-4,10-diol, nonacosane-5,10-diol, nonacosane-10,13-diol, nonacosane-12,15-diol.

4. Rubber compound according to claim 2, characterized in that said wax is derived from lotus leaves.

5. Rubber compound according to claim 1, characterized in that it comprises said wax in a quantity between 0.3 and 30 phr.

6. Rubber compound according to claim 1, characterized in that it comprises said wax in a quantity between 1 and 5 phr.

7. Portion of a tread with a rubber compound according to claim 1.

8. Pneumatic tyre comprising a tread portion according to claim 7.

9. Method for preparing a portion of pneumatic tyre tread by incorporating wax composed of at least 50% by weight of nonacosanediols within a rubber compound.

10. Method according to claim 9, characterized in that said nonacosanediols comprise a C2-C6 chain arranged between the two hydroxyl groups.

11. Method according to claim 10, characterized in that said nonacosanediols are comprised in the group comprising nonacosane-4,10-diol, nonacosane-5,10-diol, nonacosane-10,13-diol, nonacosane-12,15-diol.

12. Method according to claim 11, characterized in that said wax is derived from lotus leaves.

* * * * *